Oct. 19, 1971 H. L. GIANATASIO 3,613,318
AUTOMOTIVE VEHICLE WINDSHIELD AND WINDSHIELD WIPER AND WIPER
BLADE SHARPENER ATTACHMENT THEREFOR
Filed Dec. 10, 1969
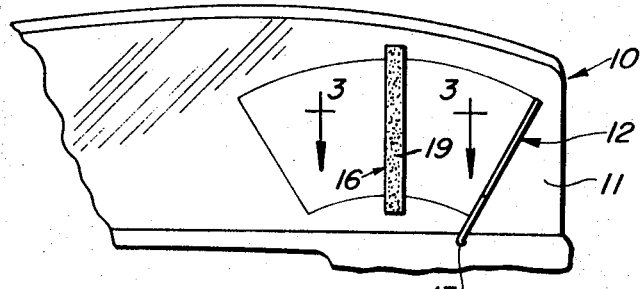
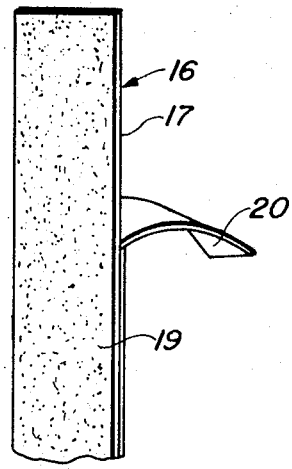
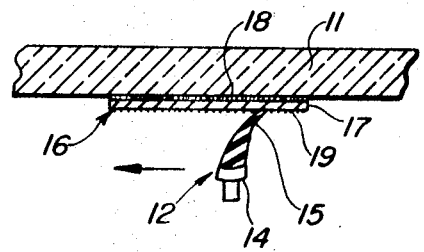
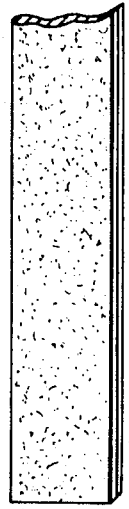
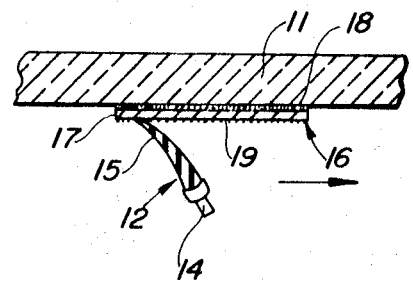
INVENTOR
HENRY L. GIANATASIO
BY *Charles B. Cannon*
ATTY

United States Patent Office 3,613,318
Patented Oct. 19, 1971

3,613,318
AUTOMOTIVE VEHICLE WINDSHIELD AND WINDSHIELD WIPER AND WIPER BLADE SHARPENER ATTACHMENT THEREFOR
Henry L. Gianatasio, River Forest, Ill., assignor to Pres-on Products, Inc., Addison, Ill.
Filed Dec. 10, 1969, Ser. No. 883,976
Int. Cl. B24b 19/00
U.S. Cl. 51—241 R   1 Claim

ABSTRACT OF THE DISCLOSURE

An automotive vehicle windshield and windshield wiper and wiper blade sharpener attachment strip therefor are provided including a strip of water-resistant cloth, fabric, paper, or like material, having a pressure-sensitive adhesive coating on one surface thereof and having an abrasive-coated surface on the other side thereof. The windshield wiper blade sharpener attachment strip is attached by the pressure-sensitive adhesive coating thereon to the outer surface of the windshield in the path of movement of the windshield wiper blade so that when the windshield wiper is moved in operation it passes over and engages the abrasive-coated outer surface of the windshield wiper blade sharpener attachment strip, thus sharpening and maintaining the wiping efficiency of the outer surface of the flexible rubber or like windshield wiper blade.

OBJECTS

An object of the present invention is to provide a combination automotive vehicle windshield and windshield wiper and wiper blade sharpener attachment therefor including a pressure-sensitive adhesive coating and abrasive-coated strip of water-resistant cloth, fabric or the like, which is adapted to be attached by its pressure-sensitive adhesive coating to the outer surface of a windshield in the path of movement of the windshield wiper blade so that the inner and wiping surface of the windshield wiper blade will engage the abrasive-coated outer surface of the windshield wiper blade sharpener attachment strip and thus keep the wiping surface of the windshield wiper blade in sharp and efficient wiping condition.

Another object of the present invention is to provide a new and improved automotive windshield wiper blade sharpener attachment strip which may be readily attached to the outer surface of an automotive windshield for engagement by the inner and wiping surface of the windshield wiper blade to maintain the inner and wiping surface of the windshield wiper blade in sharp and efficient wiping condition.

Other objects will appear hereinafter.

DESCRIPTION TO THE DRAWINGS

FIG. 1 is a fragmentary front elevational view of an automotive vehicle windshield and windshield wiper showing the new windshield wiper blade sharpener attachment strip mounted thereon;

FIG. 2 is a fragmentary perspective view of a preferred embodiment of the new windshield wiper blade sharpener attachment strip;

FIG. 3 is a fragmentary sectional plan view on line 3—3 in FIG. 1; and

FIG. 4 is a fragmentary sectional plan view similar to FIG. 3 but showing the windshield wiper blade in another position.

A preferred embodiment of the present invention is shown in the drawing, wherein it is generally indicated at 10, and comprises an automotive windshield 11 which embodies a windshield wiper blade unit 12, which is pivotally or otherwise movably mounted, at its lower end, as at 13, for movement over the outer surface of the windshield 11, as is well understood in the art. As shown, the windshield wiper blade unit 12 includes a supporting frame 14 and a flexible rubber or like flexible wiper blade 15 which is attached to the supporting frame 14, as is also well understood in the art.

The present invention further embodies a windshield wiper blade sharpener attachment member which is generally indicated at 16, and which is in the form of a strip 17 of water-resistant cloth, fabric, paper, or the like, which is preferably rectangular in shape, as shown, but may be of other shapes, such as oval, circular, or the like. The member 17 has a coating 18 of pressure-sensitive adhesive on one surface thereof; the other surface of the windshield wiper blade sharpener attachment strip 17 having a coating of finely divided abrasive material 19 thereon and adhesively secured thereto.

As shown in FIG. 2, the windshield wiper blade sharpener attachment strip member 17 has a protective flexible plastic resinous or like strip 20 removably attached thereto over the pressure-sensitive adhesive coating 18.

The pressure-sensitive adhesive coating 18 used in making the windshield wiper blade sharpener attachment strip 17 may be of any suitable type and composition such, for example, as a rubber base pressure-sensitive adhesive manufactured and sold by the Rubber and Asbestos Corporation (Division of Pittsburgh Plate Glass Co.) as its No. 551 product, or an acrylic type pressure-sensitive adhesive, or other suitable pressure sensitive adhesive. Likewise, the adhesive-coated fabric, such as cloth, paper, or the like, may be of any suitable type and composition such, for example, as the water-resistant abrasive coated "A" weight paper manufactured by the Carborudum Company and which is coated with a finely divided silicon carbide abrasive adhesively attached thereto, and of a suitable grit size, such as No. 600 grit size, or other suitable water-resistant abrasive coated cloth, fabric, paper, or the like.

In the use of the present invention the protective strip 20 may be readily and manually removed from the pressure-sensitive adhesive coating 18, whereupon the windshield wiper blade sharpener attachment strip member 17 may be mounted, by means of its pressure-sensitive adhesive coating 18, on the front and outer surface of the windshield 11 in the path of movement of the windshield wiper blade unit 12, and as the windshield wiper blade unit 12 is oscillated over the front outer surface of the windshield 11 the inner and wiping edge portion of the flexible rubber or like wiper blade 15 engages the outer and abrasive-coated surface 19 of the wiper blade sharpener attachment strip member 17, and the abrasive action of the abrasive-coated surface 19 of the wiper blade sharpener attachment strip member against the inner edge portion and wiping surface of the flexible rubber or like wiper blade 15 maintains the inner edge portion and wiping surface of the flexible rubber or like wiper blade 15 in sharp and efficient wiping condition.

It will thus be seen from the foregoing description, considered in conjunction with the accompanying drawing, that the present invention, provides a new and improved automotive vehicle windshield and windshield wiper and wiper blade sharpener attachment therefor having the desirable advantages and characteristics, and accomplishing its intended objects, including those hereinbefore pointed out and others which are inherent in the invention.

I claim:
1. An automotive windshield, windshield wiper and windshield wiper blade sharpener attachment member therefor comprising, in combination:
   (a) an automotive vehicle windshield including an outer surface; and
   (b) a windshield wiper blade sharpener attachment member attached to the said outer surface of the said automotive vehicle windshield in the path of movement of the said windshield wiper blade; said windshield wiper blade sharpener attachment member consisting of an elongated narrow strip of flexible, water-resistant material attachable vertically to the said outer surface of said automotive vehicle windshield and having (1) a coating of pressure-sensitive adhesive material on its inner surface for adhesively attaching the said windshield wiper blade sharpener attachment strip member to the said outer surface of the said automotive vehicle windshield; and having on its outer surface (2) a coating of abrasive granules adhesively attached thereto and disposed in the path of movement of the said windshield wiper blade over the said outer surface of the said windshield and engageable thereby when the said windshield wiper blade sharpener attachment strip member is attached to the outer surface of the said windshield and the said windshield wiper blade moves over the said outer surface of the said automotive vehicle windshield in use.

References Cited

UNITED STATES PATENTS

| | | | |
|---|---|---|---|
| 3,546,825 | 12/1970 | Dale | 51—323 |
| 2,286,208 | 6/1942 | Kirchner | 51—406 |
| 2,485,295 | 10/1949 | Larson | 51—406 |
| 2,888,785 | 6/1959 | Kellican et al. | 51—406 |
| 2,732,065 | 1/1956 | Marchese | 51—406 |

WILLIAM R. ARMSTRONG, Primary Examiner

U.S. Cl. X.R.

51—394